(12) United States Patent
Pierce et al.

(10) Patent No.: US 6,947,059 B2
(45) Date of Patent: Sep. 20, 2005

(54) STEREOSCOPIC PANORAMIC IMAGE CAPTURE DEVICE

(75) Inventors: Donald Pierce, Ames, IA (US); Steven M. Herrnstadt, Ames, IA (US); Trent Grover, Ames, IA (US); Frederick Good, Ames, IA (US)

(73) Assignee: Micoy Corporation, Des Moines, IA (US)

( * ) Notice: Subject to any disclaimer, the term of this patent is extended or adjusted under 35 U.S.C. 154(b) by 215 days.

(21) Appl. No.: 09/927,118

(22) Filed: Aug. 10, 2001

(65) Prior Publication Data
US 2003/0117488 A1 Jun. 26, 2003

(51) Int. Cl.⁷ ................................................ G09G 5/00
(52) U.S. Cl. ...................... 345/629; 382/284; 348/36
(58) Field of Search .................. 345/629, 679–680, 345/264, 353, 48; 382/284, 154; 348/36; 352/57, 69; 396/324

(56) References Cited

U.S. PATENT DOCUMENTS

| | | | |
|---|---|---|---|
| 3,953,869 A | | 4/1976 | Wah Lo et al. |
| 4,063,265 A | | 12/1977 | Lo et al. |
| 4,475,798 A | | 10/1984 | Smith et al. |
| 5,023,725 A | * | 6/1991 | McCutchen .................. 348/38 |
| 5,650,813 A | | 7/1997 | Gilblom et al. |
| 5,668,595 A | | 9/1997 | Katayama et al. |
| 5,721,585 A | | 2/1998 | Keast et al. |
| 5,946,077 A | | 8/1999 | Nemirovskiy |
| 5,973,726 A | | 10/1999 | Iijima et al. |
| 6,023,588 A | | 2/2000 | Ray et al. |
| 6,031,540 A | * | 2/2000 | Golin et al. ................. 345/419 |
| 6,034,716 A | | 3/2000 | Whiting et al. |
| 6,075,905 A | | 6/2000 | Herman et al. |
| 6,112,033 A | | 8/2000 | Yano et al. |
| 6,141,034 A | * | 10/2000 | McCutchen .................. 348/36 |
| 6,169,858 B1 | | 1/2001 | Ray |
| 6,236,748 B1 | | 5/2001 | Iijima et al. |
| 6,243,103 B1 | | 6/2001 | Takiguchi et al. |
| 6,320,584 B1 | * | 11/2001 | Golin et al. ................. 345/629 |
| 6,323,858 B1 | * | 11/2001 | Gilbert et al. .............. 345/419 |
| 6,337,683 B1 | * | 1/2002 | Gilbert et al. .............. 345/418 |
| 6,469,710 B1 | * | 10/2002 | Shum et al. ................. 345/619 |
| 6,559,846 B1 | * | 5/2003 | Uyttendaele et al. ....... 345/473 |
| 6,639,596 B1 | * | 10/2003 | Shum et al. ................. 345/427 |
| 6,654,019 B2 | * | 11/2003 | Gilbert et al. .............. 345/474 |
| 6,665,003 B1 | * | 12/2003 | Peleg et al. .................... 348/36 |
| 6,683,608 B2 | * | 1/2004 | Golin et al. ................. 345/419 |

OTHER PUBLICATIONS

Pritch, Ben–Ezra, Peleg; "Automatic Disparity Control in Stereo Panoramas (OmniStereo)," Omnidirectional Vision, 2000, Proceedings, IEEE Workshop on Jun. 12, 2000.*

Chen, Y.P., "Landscape Generation: A Changing Perspective," ESD: The Electronic System Design Magazine, v18, Feb. 1988, p. 44.*

(Continued)

Primary Examiner—Matthew C. Bella
Assistant Examiner—Alysa N. Brautigam
(74) Attorney, Agent, or Firm—Schwegman, Lundberg, Woessner & Kluth, P.A.

(57) ABSTRACT

An imaging system comprising a plurality of first image capture devices. Overlapping rectilinear images are captured and halved, with the left halves being stitched and transformed into a first equirectangular image and the right halves being stitched and transformed into a second equirectangular image. The first equirectangular image, and second equirectangular image are displayed in a stereoscopic orientation to produce a stereoscopic equirectangular image. The imaging system may be utilized to capture a plurality of sequential images, to produce a full-motion stereoscopic equirectangular image.

57 Claims, 10 Drawing Sheets

OTHER PUBLICATIONS

"A full sphere camera for point of view and VR photography", by Dan Slater dslater@ix.netcom.com.

WO1998US0013465, filed Apr. 8, 1999 by Live Picture, Inc. Virtual Reality Camera.

US1995000458060 filed Aug. 12,1997 Panoramic Viewing Systems, Inc. Seamless multip-camera panoramic imaging.

US1996000600893 filed Feb. 13, 1996, Carmein, David Virtual reality system with enhanced sensory apparatus.

US1995000401550 filed Mar. 10, 1995 Carmein, David Omni-directional—treadmill.

Portable All-Sky Reflector with "Invisible" Axial Camera Support by Jeffrey R. Charles of Versacorp.

Polar Projection and X-Y Omnidirectional Images Jeffrey R. Charles copyright 1978–1997.

Globuscope Panoramic Camera—Advertisement.

* cited by examiner

STEREOSCOPIC PANORAMIC IMAGE CAPTURE DEVICE

BACKGROUND OF THE INVENTION

1. Field of the Invention

The present invention relates in general to a panoramic image capture device and, more specifically, to a panoramic image capture device for producing a stereoscopic panoramic image.

2. Description of the Prior Art

Panoramic cameras are known in the art. Such cameras often use a single, rotatable camera. Although such devices are suitable for stationary images, such devices typically produce blurred or distorted images when used to capture non-stationary objects. It is also known in the art to utilize an image capture system having a plurality of image capture devices. In this manner, a plurality of images can be captured, substantially simultaneously, and stitched together using processes known in the art. Although such systems substantially eliminate the problem associated with capturing objects in motion, such systems do not provide means for producing a stereoscopic image.

It is also known in the art to use a "fish-eye" lens to capture a panoramic image. Such images, however, import a large amount of distortion into the resulting image, and capture images of relatively low quality. Accordingly, it would be desirable to produce a panoramic image of lower distortion and higher quality.

Typically, to capture a stereoscopic image, two imaging systems are positioned next to one another to capture a particular image. Unfortunately, this method cannot be extrapolated to producing a stereoscopic panoramic image, as one image capture device would necessarily fall into the field of view of the adjacent image capture device. It would be desirable, therefore, to provide a panoramic image capture system which could be utilized to produce a stereoscopic pair of panoramic images for a stereoscopic display of a particular image.

SUMMARY OF THE INVENTION

In an advantage provided by this invention, an image capture system produces a stereoscopic pair of panoramic images.

Advantageously, this invention provides an image capture system for producing a seamless panoramic image.

Advantageously, this invention provides an image capture system for producing a stereoscopic panoramic image in motion.

Advantageously, this invention provides a stereoscopic panoramic image of minimal distortion.

Advantageously, this invention provides an imaging system for full-motion, real time, panoramic stereoscopic imaging.

Advantageously, in a preferred example of this invention, an imaging system is provided comprising a first image capture device, a second image capture device, and a third image capture device. Means are also provided for combining at least a first portion of a first image captured using the first image capture device with a portion of a second image captured using the second image capture device to produce a first combined image. Means are also provided for combining at least a second portion of the first image with at least a portion of a third image captured using the third image capture device, to produce a second combined image.

In the preferred embodiment, a plurality of image capture devices are utilized to produce a plurality of images, a portion of each of which is combined with a portion of adjacent images to produce a first combined panoramic image. Similarly, a second portion of each image is combined with separate portions of adjacent images to produce a second combined panoramic image. Preferably, the first combined panoramic image, and second combined panoramic image are displayed in a stereoscopic orientation to produce a stereoscopic panoramic image. The imaging system of the present invention may be utilized to capture a plurality of images, to produce a full-motion stereoscopic panoramic image.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
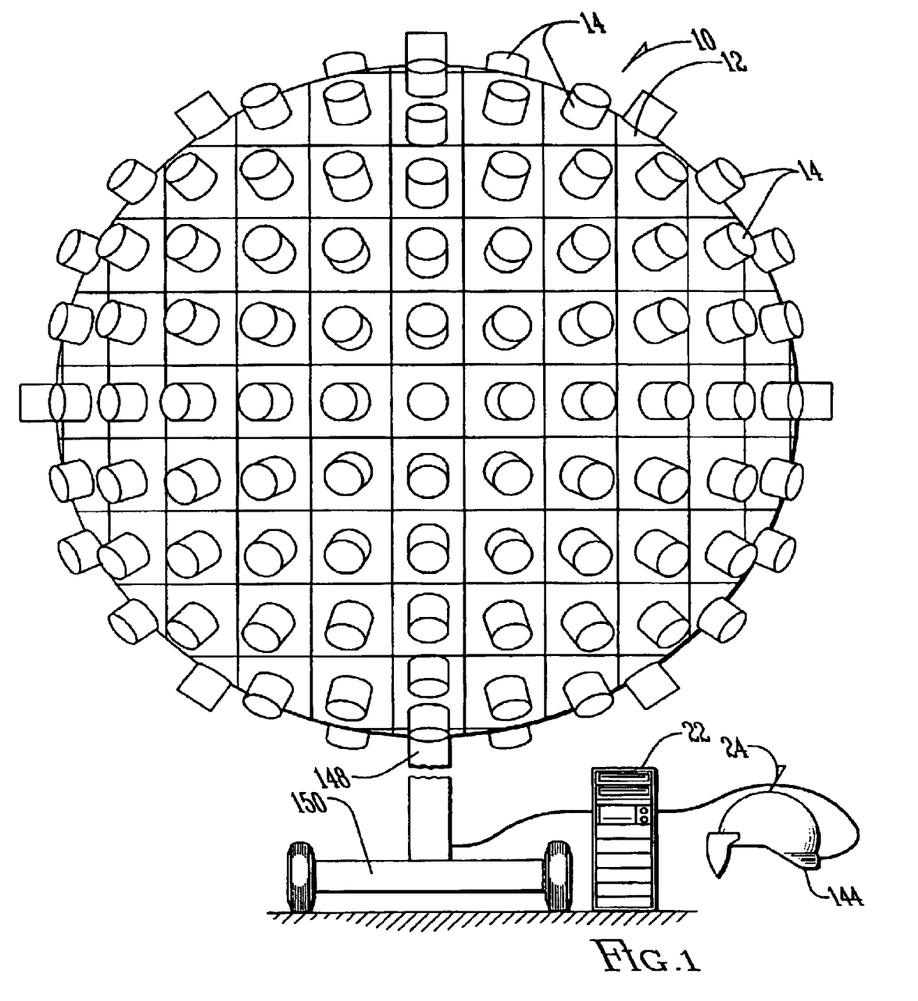
FIG. 1 illustrates a front elevation of the imaging system of the present invention.
Figure 2:
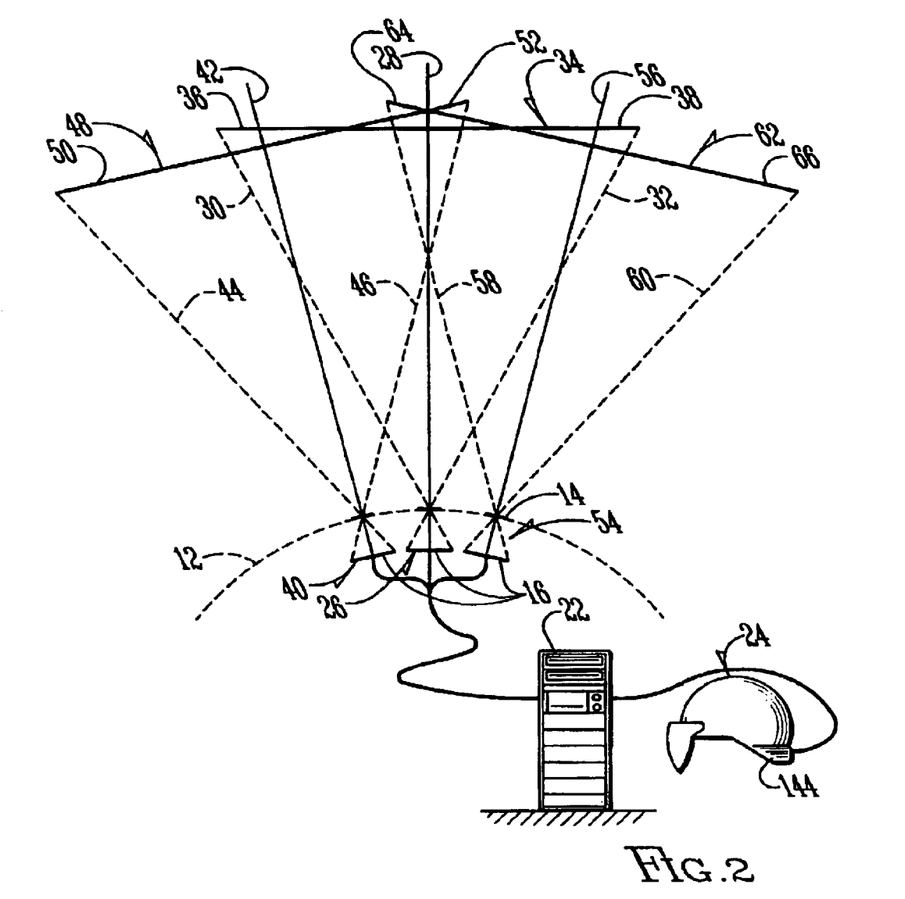
FIG. 2 illustrates a graphic depiction of image capture regions of adjacent image capture devices of the imaging system of the present invention.

Referring to FIG. 1, a camera (10) is shown having a body (12) constructed of plastic or other similar lightweight material. In the preferred embodiment, the body (12) is substantially spherical, having a diameter preferably between 0.001 and 500 centimeters, and more preferably, between 10 and 50 centimeters. Provided substantially equally spaced across the surface of the body (12) are a plurality of lenses (14). The lenses (14) are preferably circular lenses having a diameter of preferably between 5 angstroms and 10 centimeters, and more preferably, between 0.5 and 5 centimeters. In the preferred embodiment, the lenses are model number BCL38C 3.8 millimeter micro lenses, manufactured by CBC America, located at 55 Mall Drive, Commack, N.Y. 11725. As shown in FIG. 2, the lenses (14) are each associated with a charge coupled device (CCD) assembly (16), such as those well known in the art. Although in the preferred embodiment a GP-CX171/LM CCD color board camera, manufactured by Panasonic and available from Rock2000.com is used, any known image capture system may be used. As shown in FIG. 2, all of the CCD assemblies (16) are coupled to a central processing unit (CPU)(22). In the preferred embodiment, the CPU (22) is a 900 MHz, Pentium®4 class personal computer provided with an Oxygen GVX210 graphics card manufactured by 3Dlabs of 480 Pontrero, Sunnyvale, Calif. 94086. Although the CPU may be of any type known in the art, it is preferably capable of quad buffering and utilizing page flipping software in a manner such as that known in the art. The CPU (22) is coupled to a head mounted display (24) which, in the preferred embodiment, is a VFX3D, manufactured by Interactive Imaging Systems, Inc., located at 2166 Brighton Henrietta Townline Road, Rochester, N.Y. 14623.

As shown in FIG. 2, the lenses (14) are divergent from one another, and offset twenty degrees from one another along the arcuate surface of the body (12). This divergency allows each lens to have a substantially similar focal point. Each lens (14) has a fifty-three degree field of view, which overlaps the field of view of a laterally adjoining lens by between ten and ninety percent, and, preferably, between fifty and sixty-five percent. As shown in FIG. 2, a first image capture unit (26) is associated with an optical axis (28), bisecting the image bordered on one side by a left side plane (30) and on the other side by a right side plane (32). The lens (14) of the image capture unit (26) is focused on a defined image plane (34), divided into a left image plane (36) and a right image plane (38).

Similarly, a second image capture unit (40) is also provided with an optical axis (42), a left side plane (44), a right side plane (46), a defined image plane (48), a left image plane (50), and a right image plane (52). A third image capture unit (54), to the right of the first image capture unit (26), is provided with optical axis (56), a left side plane (58), a right side plane (60), a defined image plane (62), a left image plane (64), and a right image plane (66).

Figure 5A:
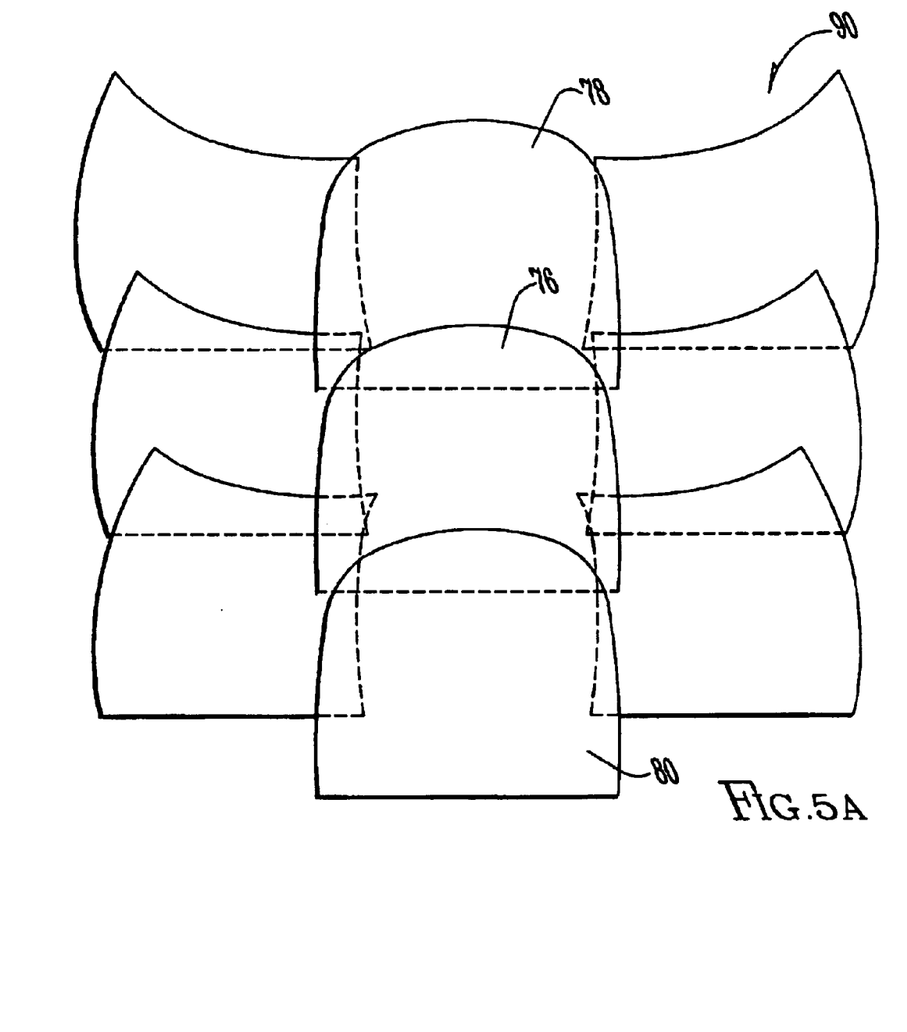
FIGS. 5A–5B illustrates images associated with first image buffer and second image buffer.
Figure 5B:
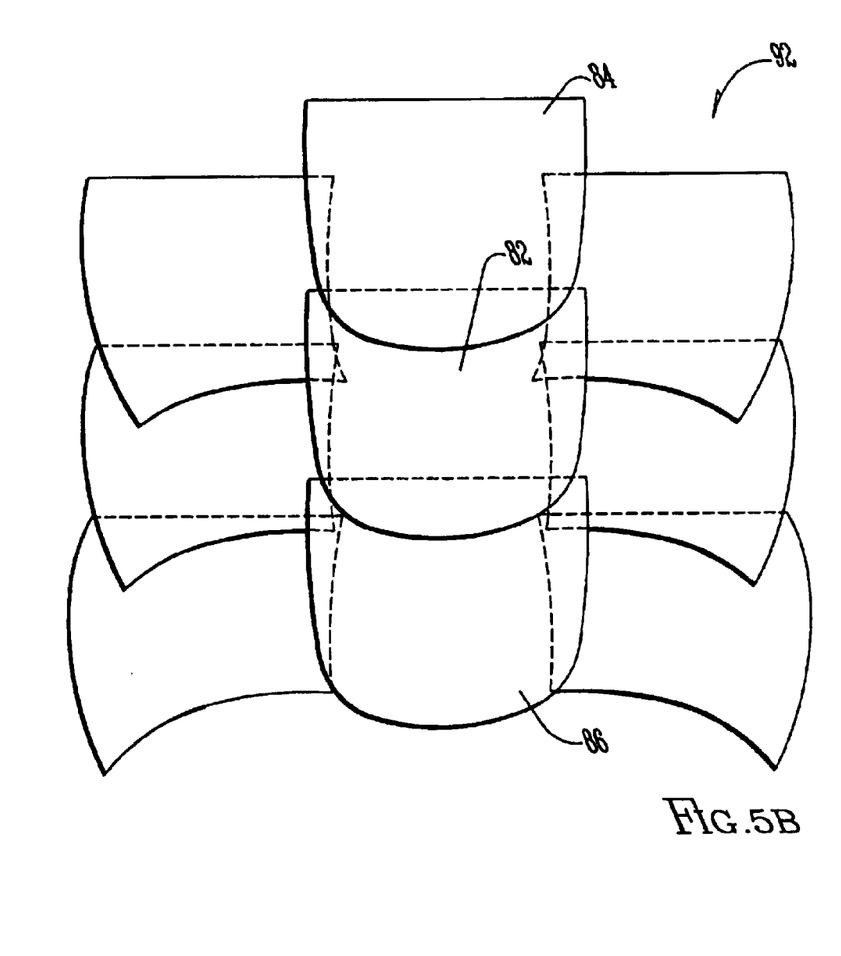

By providing a plurality of image capture units (26), (40) and (54), dividing the defined image planes (34), (48) and (62) in halves, and orienting the image capture units (26), (40) and (54) as shown in FIG. 2, every point associated with a final panoramic image is within the defined image plane of at least two adjacent image capture units, (26), (40) or (54). As shown in FIGS. 5A–5B, the defined image planes of adjacent image capture units overlap vertically, preferably about 1–20 percent, more preferably 5–10 percent, and 7 percent in the preferred embodiment. Similarly, the defined image planes of adjacent image capture units overlap horizontally, preferably about 20 percent, more preferably 5–10 percent, and 6 percent in the preferred embodiment. These overlaps aid in the "stitching" process described below.

Figure 3:
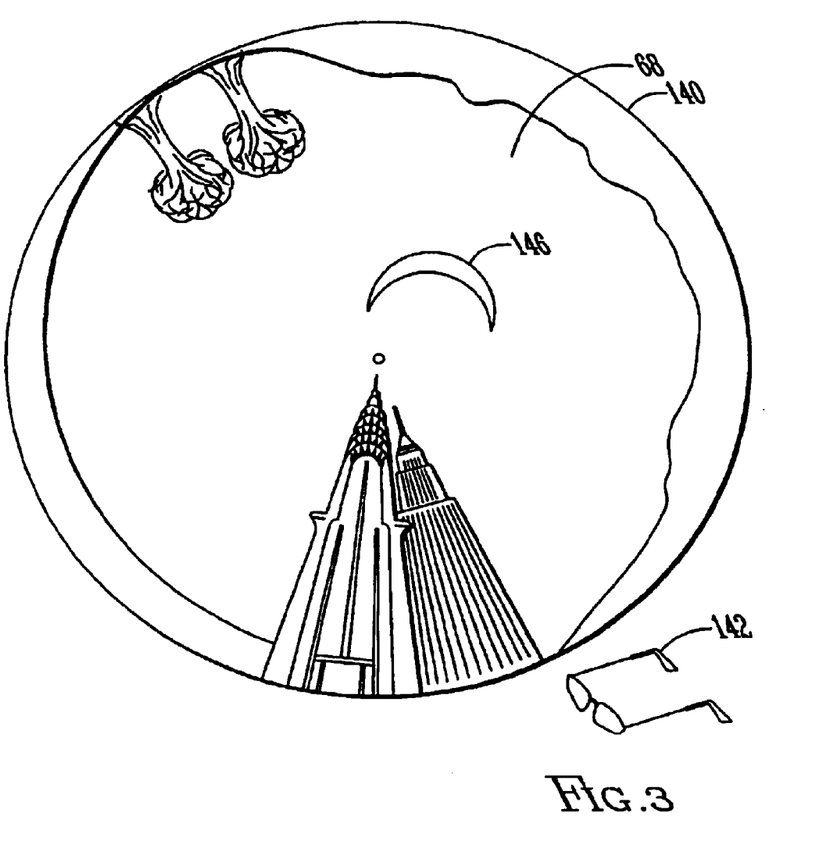
FIG. 3 illustrates a bottom perspective view of the final panoramic stereoscopic image displayed on a screen, and the polarized glasses used to view the image.
Figure 4A:
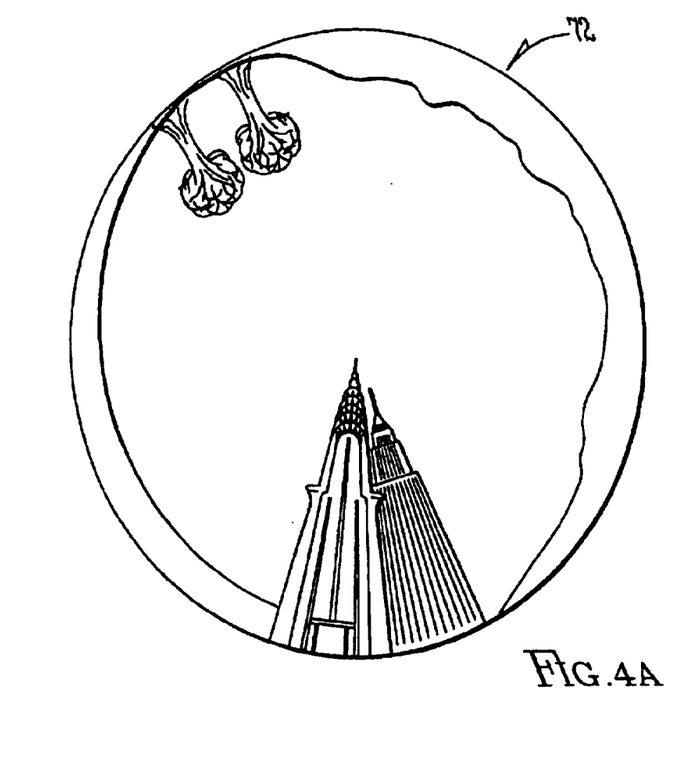
FIGS. 4A–4B illustrate a left panoramic image and right panoramic image.
Figure 4B:
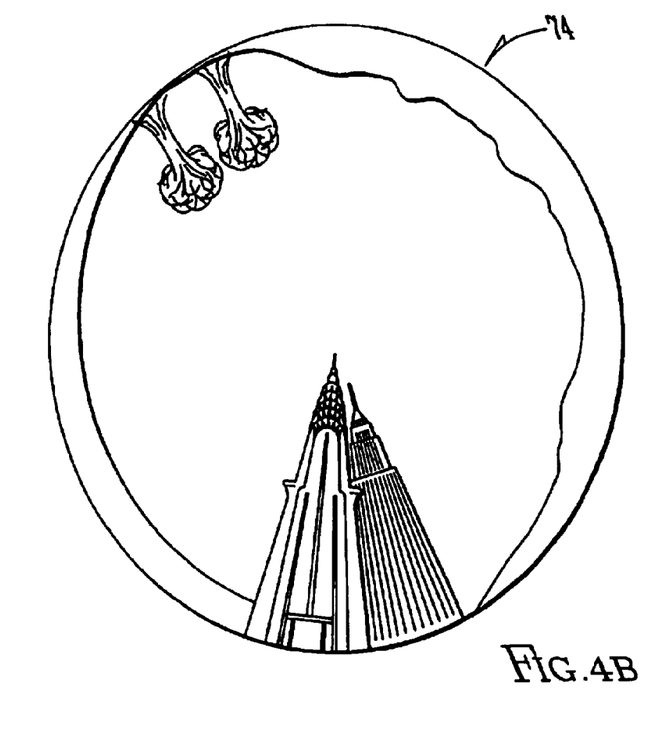

To produce the final panoramic image (68) of the present invention, a first panoramic image (72) and second panoramic image (74) are created. (FIGS. 3 and 4A–4B). To create the first panoramic image (72), an image (76), associated with the left image plane (36) of the first image capture unit (26) is combined with an image (78), associated with the left image plane (50) of the second image capture unit (40) and an image (80), associated with the left image plane (64) of the third image capture unit (54). (FIGS. 2, 4A and 5A). As shown in FIG. 2, the associated image planes (36), (50) and (64), preferably overlap by 0.5–30 percent, more preferably by 10–20 percent, and 13 percent in the preferred embodiment, but are not parallel to one another, and are not tangent to a curve defining the first panoramic image (72). (FIGS. 2 and 4A). Accordingly, the images (76), (78), (80), (82), (84) and (86), associated with planes (36), (50) and (64) must be transformed, to remove distortion associated with their non-parallel orientation, before they can be stitched together as described below to form the final panoramic image (68). (FIGS. 2, 3, 4A–4B and 5A–5B).

Once the images (76), (78) and (80), associated with the left image planes (38), (52), (66), and the images (82), (84) and (86), associated with the right image planes (36), (50) and (64) have been collected from all of the image capture units (26), (40) and (54), the images are transmitted via hardwired, wireless, or any desired connection to the CPU (22). The CPU (22) then transforms the images in accordance with the process described in FIGS. 6A–6C. (FIGS. 2, 4A and 5A). As shown in step (88), source images, which in the preferred embodiment are rectilinear images, but which may, of course, be any type of image, are obtained from the image capture units (26), (40) and (54). (FIGS. 2, 4A, 4B and 6). As shown in step (94), the CPU (22) defines registration pixel pairs for the untransformed source images.

Figure 6A:
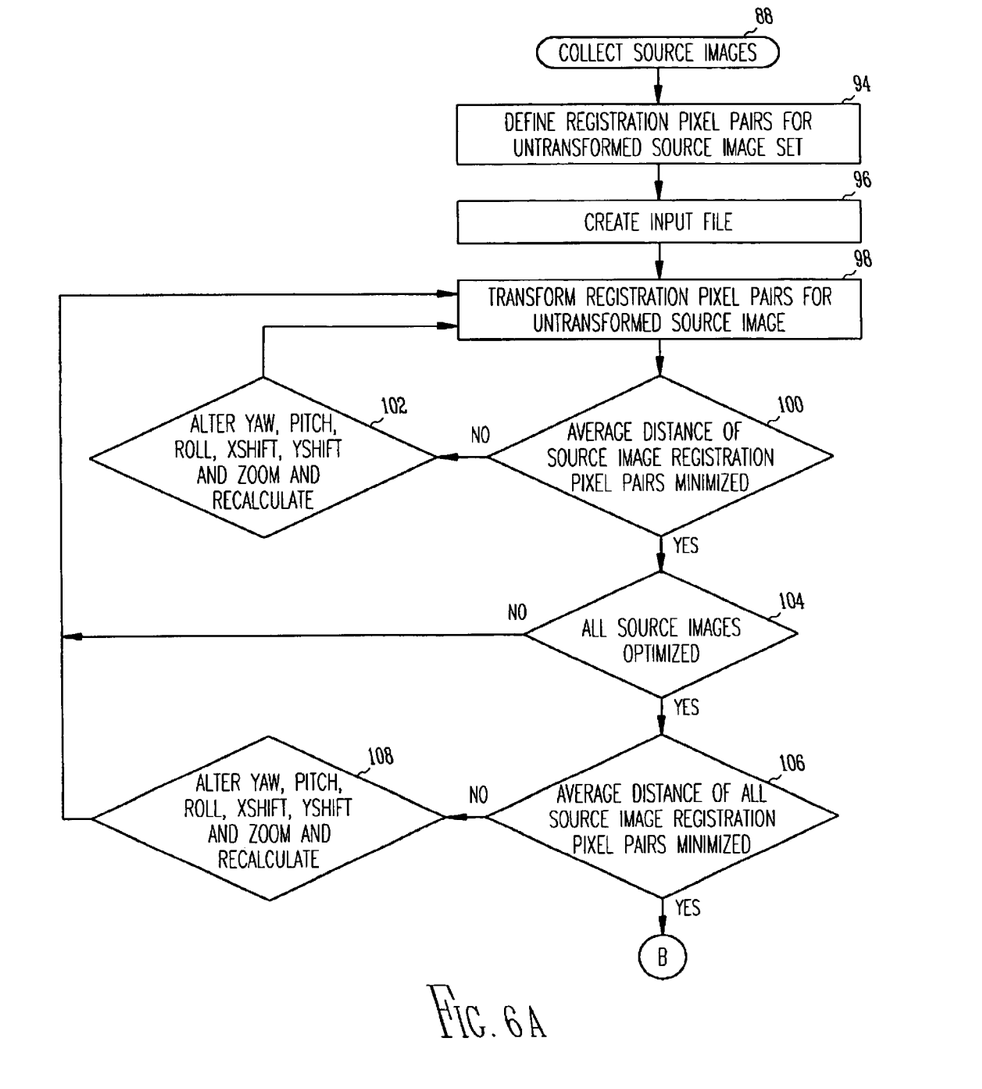
FIGS. 6A–6C are a flowchart of the transformation process utilized in association with the imaging system of the present device, to transform the plurality of images captured with the imaging devices into a first panoramic image and a second panoramic image to produce a stereoscopic panoramic image.

Thereafter, as shown in step (96), the CPU(22) creates an input file. The input file includes the height and width of the final panoramic image (68), the source information, and registration point information. The source information includes the file name and path of the source image, the height and width of the source image in pixels, and the yaw, pitch and roll angles of the source of the associated image capture unit. The horizontal field of view of the image capture unit, which is preferably between 1 and 80 degrees, more preferably between 30 and 60 degrees, and 53 degrees in the preferred embodiment, is defined by the left side plane and right side plane, the X Shift, Y Shift and zoom values of the source image. The information associated with the registration points includes information regarding the source image associated with the first pixel position of the registration point, a horizontal and vertical pixel position in the first source image, list index of information regarding the source image associated with the second pixel position, and a horizontal and vertical pixel position in the second source image.

The images (76–86) associated with the image planes (36, 38, 50, 52, 64 and 66) are rectilinear, normal flat-field images, and the panoramic images (72 and 74) are equirectangular, representing pixel mapping on a spherical surface in a manner such as that shown in FIGS. 4A–4B. Accordingly, once the CPU (22) creates the input file, as shown in step (98), the registration pixel pairs must be transformed to locate their position in the final panoramic image (68).

Starting with an arbitrary source image, a vector is defined that represents a first pixel of a given registration pixel pair in three-dimensional space, locating it on the final panoramic image (68). This is accomplished by applying the following matrix transformation to each pixel:

Define segment x: Alter the horizontal position of the pixel in the source image so that it is relative to the image's center. Then compensate for the xShift and zoom variables of the source image.

Define segment y: Alter the vertical position of the pixel in a similar way.

Define segment z: Using various source image variables, determine the z segment that corresponds to the scale provided by the image's size in pixels.

Transform the vector so that it corresponds to the rotation angles of the source camera. This is calculated by transforming the vector by each of three rotational matrices:

Rotation about x-axis:

$$\begin{pmatrix} 1 & 0 & 0 & 0 \\ 0 & \cos(\text{pitch}) & \sin(\text{pitch}) & 0 \\ 0 & -\sin(\text{pitch}) & \cos(\text{pitch}) & 0 \\ 0 & 0 & 0 & 1 \end{pmatrix}$$

Rotation about y-axis:

$$\begin{pmatrix} \cos(\text{yaw}) & 0 & -\sin(\text{yaw}) & 0 \\ 0 & 1 & 0 & 0 \\ \sin(\text{yaw}) & 0 & \cos(\text{yaw}) & 0 \\ 0 & 0 & 0 & 1 \end{pmatrix}$$

Rotation about z-axis:

$$\begin{pmatrix} \cos(\text{roll}) & \sin(\text{roll}) & 0 & 0 \\ -\sin(\text{roll}) & \cos(\text{roll}) & 0 & 0 \\ 0 & 0 & 1 & 0 \\ 0 & 0 & 0 & 1 \end{pmatrix}$$

Upon matrix transformation, the pixel vector represents the global globX, globY, and globZ positions of that point in three-dimensional space. The CPU (22) then converts these positions into spherical coordinates and applies them directly to the final panoramic coordinates. The vector's yaw angle represents its horizontal panorama position, newX, and its pitch angle represents its vertical panorama position, newY.

As shown in step (100), once the registration pixel pairs have been mapped to the final panoramic image (68) in this manner, the CPU (22) calculates the distance between the registration pixel pairs. If the average distance of the registration pixel pairs for a given source image are not yet minimized, as would be the case upon the initial transformation, shown in step (102), the yaw of the source image is altered slightly, whereafter the process returns to step (98) and the registration pixel pairs are again transformed to pixel points in the final panoramic image (68). This process continues, altering the yaw, until the average distance of the source image registration pixel pairs is minimized. Thereafter, the pitch, roll, X Shift, Y Shift and zoom are altered, until the average distance of the associated registration pixel pairs is minimized. Once the yaw, pitch, roll, X Shift, Y Shift and zoom of a particular source image is optimized, as shown in step (104), the transformation procedure is repeated for all source images until they are all thus optimized.

As shown in step (106), once all of the source images have been thus optimized, the average distance of all source image registration pixel pairs is calculated and, if they are not yet minimized, the yaw, pitch, roll, XShift, YShift and zoom of the source images are altered as shown in step (108), and the process returns to step (98), where the process continues, until the distance between the registration pixel pairs is minimized across all of the source images.

Figure 6B:
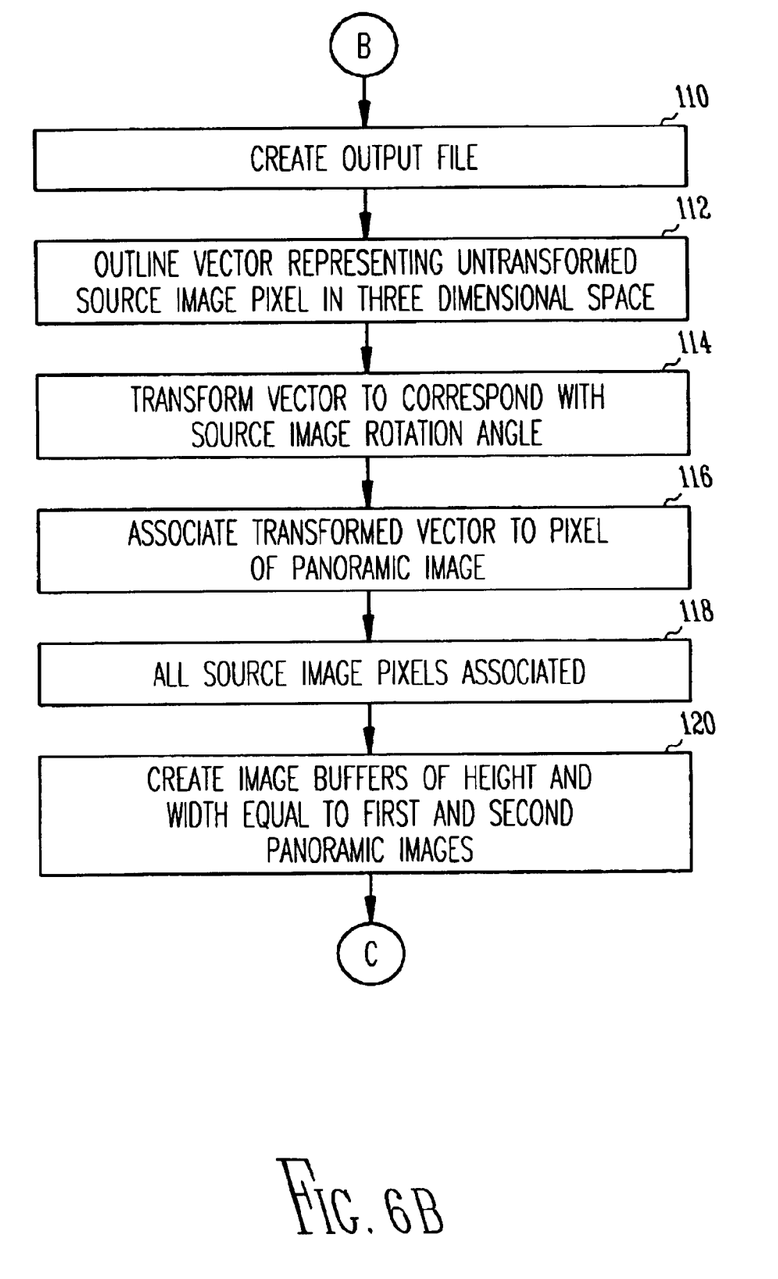

Once the average distance between the registration pixel pairs has been minimized across all source images, as shown in step (110), an output file is created, identifying the height and width of the first panoramic image (72), the yaw, pitch, roll, XShift, YShift and zoom transformation image information relative to each particular source image. Thereafter, as shown in step (112), for each pixel within a given source image, a vector is defined representing the particular pixel's position in three dimensional space, using the vector transformation described above.

Once a vector has been defined, as shown in step (114), the vector is transformed to reflect the yaw, pitch, roll, XShift, YShift and zoom information associated with the source image as defined in the output file. After completion of the transformation of the vector, as shown in step (116), the transformed vector is associated with a pixel in the final panoramic image (68). As shown in step (118), this process is repeated until all of the pixels in a particular source image have been transformed into vectors, and their position located on the final panoramic image (68)

As shown in step (120), once all of the pixels of a given source image have been located on the final panoramic image (68), two image buffers (90) and (92) are created, each having a height and width equal to that of the final panoramic image (68). (FIGS. 3, 5A–5B and 6B). As shown in step (122), once the image buffers (90) and (92) have been created, vector transformation information associated with a quadrilateral of four adjacent pixels of a particular source image is utilized to draw the quadrilateral of pixels onto the appropriate image buffer (90) or (92). (FIGS. 5A–5B and 6C). If the pixel is in the left image planes (38), (52) or (66), the pixel is written to the left image buffer (90). If the pixel is in the right image planes (36), (50) or (64), the pixel is in the right image buffer (92). (FIGS. 2 and 5A–5B).

Figure 6C:
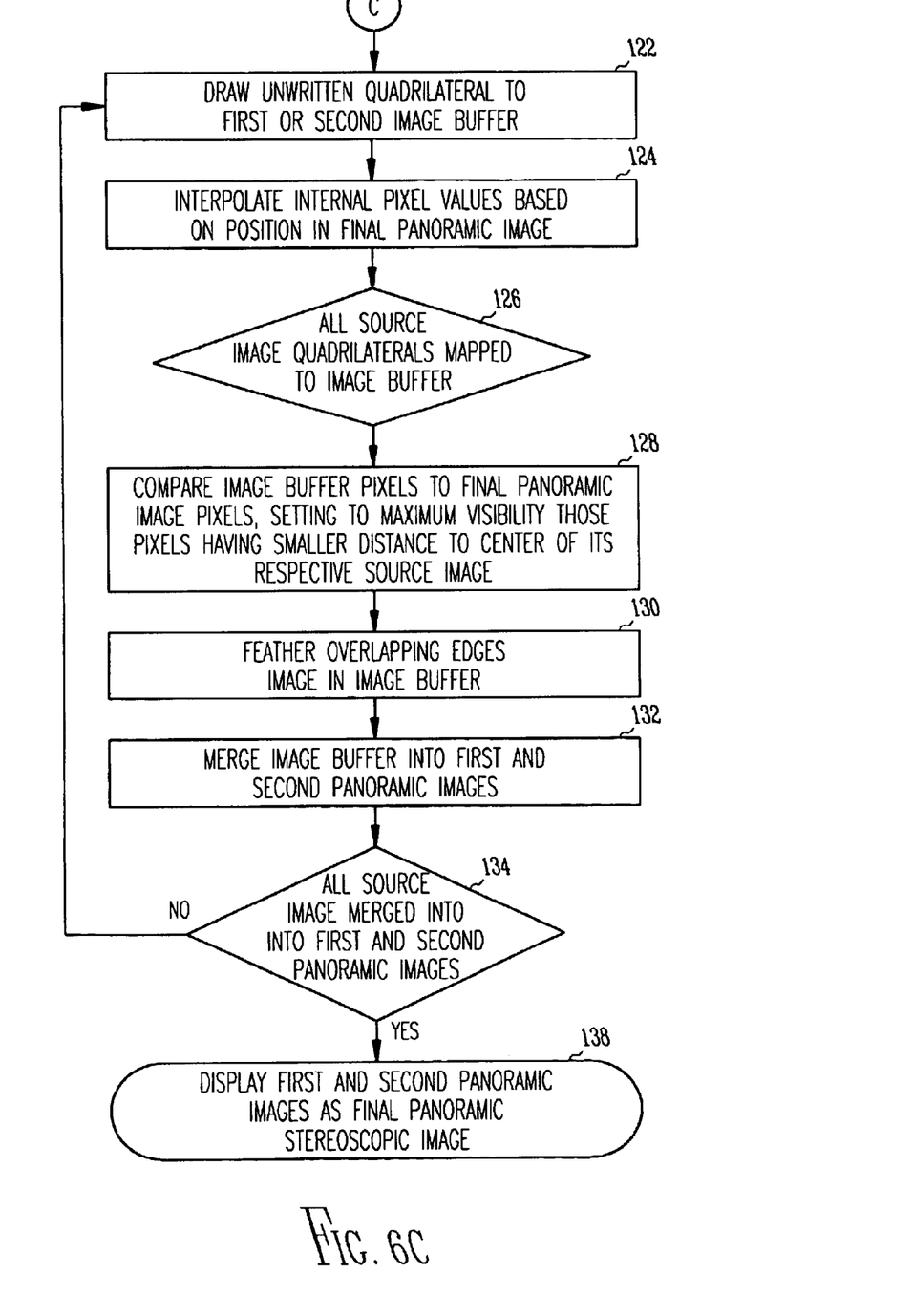

As shown in step (124), since the transformation is likely to spread out the quadrilateral of pixels on the image buffer, there will likely be gaps between pixels as they are converted from their rectilinear location to their equirectangular location in the associated image buffer (90) or (92). (FIGS. 5A–5B and 6C). When the quadrilateral of pixels is located on the associated image buffer (90) or (92), the gaps thereby created are filled as smoothly as possible, using a linear gradient of the corner pixel colors, in a manner such as that known in the art. Known linear gradient fill techniques are also used to diminish visible seams between images. As additional source image information is applied to the image buffers (90) and (92), for areas of the image buffers (90) and (92) that have already been filled with pixel data, the alpha transparency of the new overlapping pixels is linearly degraded, smoothing the resulting seam as described below.

Accordingly, when mapping the quadrilateral to the associated image buffer (90) or (92), the central processing unit (22) eliminates the gaps by interpolating the internal pixel values, using any method known in the art, which may include comparing the gap to the adjacent pixels, or "white boxing" the gap by utilizing the immediately preceding frame and immediately succeeding frame in a motion capture system, to extrapolate the most appropriate pixel value for the gap. As shown in step (126), steps (122) and (124) are repeated until all of the source image pixels have been mapped to the appropriate image buffer (90) or (92).

Once all of the pixels have been mapped, as shown in step (128), the first image buffer pixels are compared to the first panoramic image pixels. If the first panoramic image (72) does not have a pixel associated with a pixel in the first image buffer (90), the CPU (22) sets the pixel in the first image buffer (90) to maximum visibility. If the first panoramic image (72) already has a pixel associated with a pixel in the first image buffer (90), the existing pixel is compared to the corresponding pixel in the first image buffer (90). If the pixel in the first image buffer (90) has a shorter distance to the center of its respective source image than does the existing pixel, the pixel in the first image buffer (90) is set to maximum visibility. Conversely, if the pixel in the first image buffer (90) has a greater distance to the center of its respective source image than that of the existing pixel, then the pixel in the first image buffer (90) is set to minimum visibility. The process is repeated to merge pixels of the second image buffer (92) into the second panoramic image (74).

As shown in step (130), the overlapping edges of the image in the image buffers (90) and (92) are feathered by degrading visibility of the pixels over the area of overlap. This feathering smoothes the overlapping areas of the image once it is merged from the image buffers (90) and (92) into the panoramic images (72) and (74). As shown in step (132), once the image buffer pixels have been set to the appropriate visibility, and the image of the image buffers feathered, the images in the image buffers are merged into the first and second panoramic images (72) and (74). As shown in step (134), steps (122) through (132) are repeated until all of the source images have been merged into the first and second panoramic images (72) and (74). As noted above, the images (76), (78) and (80) associated with the left image planes (36), (50) and (64) of the image capture units (26), (40) and (54) are used to create the first panoramic image (72), and the images (82), (84) and (86) associated with the right image planes (38), (52) and (66) of the image capture units (26), (40) and (54) are used to create the second panoramic image (74).

Once both of the final panoramic images (72) and (74) have been created, as shown in step (138), the panoramic images (72) and (74) are displayed together as the final panoramic image (68). (FIGS. 3, 4A and 4B). The panoramic images (72) and (74) may be reverse polarized, shown on a standard panoramic screen (140), such as that shown in FIG. 4, and viewed using glasses (142) having lenses of reversed polarity. Alternatively, the panoramic images (72) and (74) may be conveyed digitally to the head mounted display (24) shown in FIG. 1. The CPU (22) can send multiple panoramic images to the head mounted display (24) using known "page-flipping" techniques to send and separately display the images in the left and right displays of the head mounted display (24), as appropriate. This process can be used to animate the display as a full 24 frame per second motion picture, or to display multiple visual images to each display. The head mounted display unit (24) may also be provided with an orientation sensor (144), such as those well known in the art, to change the image provided to the head mounted display (24) as the imaging unit moves. In this manner, a user (not shown) may look up, down, and in either direction, to see that portion of the final panoramic image (68) associated with the vector of the user's line of sight. In this manner, the user will have the feeling of actually looking around a three-dimensional space.

In an alternative embodiment of the present invention, the camera may be provided with a plurality of image capture pairs having rectilinear capture systems oriented substantially parallel to one another. The pairs are offset by a predetermined factor to obtain a desired stereoscopic image. Because the images are captured in pairs, the transformation process associated with this embodiment is identical to that described above, albeit instead of dividing the images in half, and sending pixels from each half to a separate image buffer, all of the pixels associated with the images from the "left" image capture devices of each image capture device pair are sent to one image buffer, and all of the pixels associated with images from the "right" image capture devices are sent to another image buffer.

In another alternative embodiment of the present invention, the camera (10) and CPU (22) may be utilized to capture twenty-four or more frames per second, and display the final panoramic image (68), in real time, as a motion picture.

In yet another alternative embodiment of the present invention, computer generated graphical information, produced in a manner such as that well known in the art, may be combined with the final panoramic images (72) and (74) in the central processing unit (22) to provide a seamless integration of actual images captured with the camera (10), and virtual reality images (146). (FIG. 3) This combination produces a seamless display of real and virtual panoramic stereographic virtual images.

Figure 7:
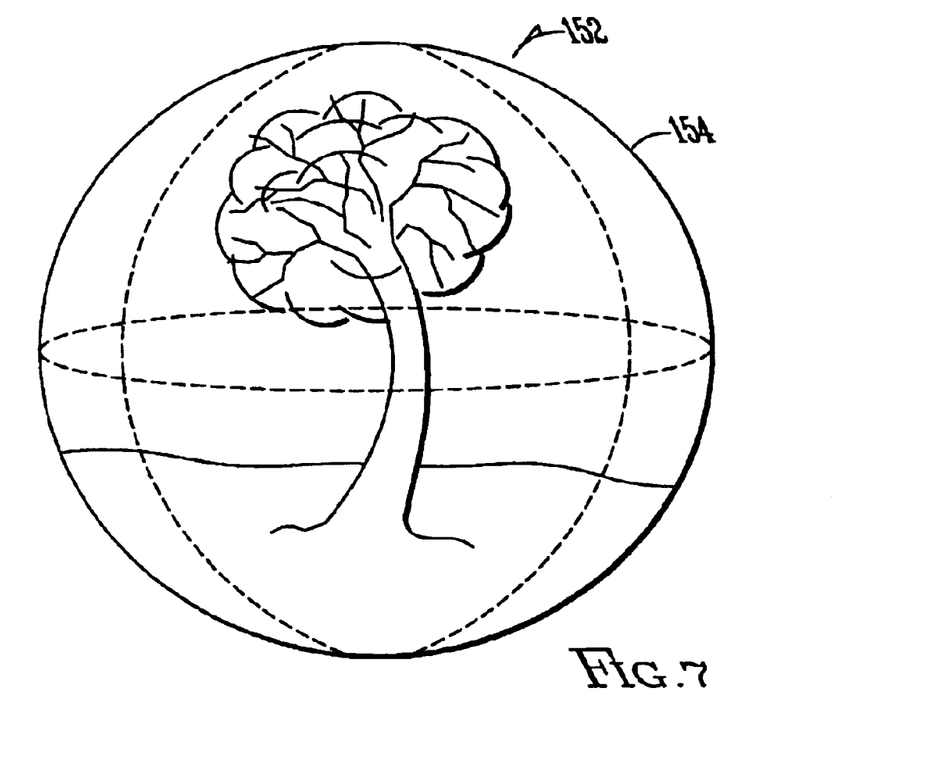
FIG. 7 illustrates a perspective view of a 360 degree unobstructed panoramic stereoscopic image, created using the camera of FIG. 1.

In yet another alternative embodiment of the present invention, the images captured by the camera (10) may be transformed, utilizing the above transformation procedures, to produce a seamless 360-degree panoramic monographic image. As shown in FIG. 1, the camera (10) is provided with a support post (148) and a transportation unit such as a remote control carriage (150) used in association with remote control cars and the like. Images associated with the left image planes of the image capture units may be used to produce a combined image and the images associated with the right image planes of the image capture units may be used to overwrite and fill the combined image to hide the support post (148), carriage (150) and any other camera equipment otherwise visible in the combined image. The foregoing transformation procedures may be utilized for such overwriting and filling. In this manner, only those images which do not include the undesired information are mapped to a final panoramic image (152), which may be displayed on a spherical screen (154) or on the head mounted display (24). (FIGS. 1 and 7). For that portion of the image reflecting the area covered by the footprint of the carriage (150), the interpolation and feathering procedures detailed above may be utilized to approximate the image lying beneath the carriage (150), to produce the appearance of a completely unobstructed 360-degree image.

Although the invention has been described with respect to the preferred embodiment thereof, it is to be also understood that it is not to be so limited, since changes and modifications can be made therein which are within the full intended scope of this invention as defined by the appended claims.

What is claimed is:

1. An imaging system comprising:
    (a) a first image capture device;
    (b) a second image capture device;
    (c) a third image capture device;
    (d) means for combining at least a first portion of a first image captured with said first image capture device with a portion of a second image captured with said second image capture device, to produce a first combined equirectangular image; and
    (e) means for combining at least a second portion of said first image with at least a portion of a third image captured with said third image capture device to produce a second combined equirectangular image that is different from said first combined equirectangular image,
        wherein said second combined equirectangular image does not comprise a majority of said first portion of said first image.

2. The imaging system of claim 1, wherein said first image capture device, said second image capture device, and said third image capture device are provided arcuately relative to one another, no closer than about five degrees apart.

3. The imaging system of claim 1, wherein said first image capture device, said second image capture device, and said third image capture device are provided arcuately relative to one another, no closer than about ten degrees apart.

4. The imaging system of claim 1, wherein said first image capture device, said second image capture device, and said third image capture device are provided arcuately relative to one another, no closer than about forty-five degrees apart.

5. The imaging system of claim 1, wherein said first image capture device, said second image capture device, and said third image capture device are provided arcuately relative to one another, no closer than about twenty degrees apart.

6. The imaging system of claim 1, wherein said first portion of said first image is greater than about twenty percent of said first image, and wherein said portion of said second image is greater than about twenty percent of said second image.

7. The imaging system of claim 6, wherein said first portion of said first image is less than about eighty percent of said first image, and wherein said portion of said second image is less than about eighty percent of said second image.

8. The imaging system of claim 1, wherein said first portion of said first image is less than about eighty percent of said first image, and wherein said portion of said second image is less than about eighty percent of said second image.

9. The imaging system of claim 1, wherein said first image and said second image are substantially rectilinear.

10. The imaging system of claim 1, wherein said second image and said third image are digital images.

11. The imaging system of claim 1, further comprising means for sequentially displaying a plurality of combined images in a manner which conveys motion.

12. The imaging system of claim 1, further comprising means for displaying said first combined equirectangular image and said second combined equirectangular image as a stereoscopic image.

13. The imaging system of claim 12, wherein the stereoscopic image forms a portion of a 360 degree panoramic stereoscopic image.

14. The imaging system of claim 1, further comprising means for combining said first combined equirectangular image with a sufficient plurality of images to produce a first combined panoramic image, representing at least about 90 degrees of a scene, and combining said second combined equirectangular image with a sufficient plurality of images to produce a second combined panoramic image, representing about 90 degrees of a scene, and means for displaying said first combined panoramic image and said second combined panoramic image in a manner which produces a stereoscopic, panoramic image.

15. The imaging system of claim 14, further comprising displaying a first set of combined panoramic images and a second set of combined panoramic images in succession, in a manner which produces a succession of visual information.

16. The imaging system of claim 14, further comprising displaying a first set of combined panoramic images and a second set of combined panoramic images in succession, in a manner which produces a stereoscopic panoramic motion picture.

17. The imaging system of claim 14, wherein the stereoscopic, panoramic image forms a portion of a 360 degree panoramic stereoscopic image.

18. The imaging system of claim 1, further comprising means for combining said first combined equirectangular image with a sufficient plurality of images to produce a first combined panoramic image, representing at least about 180 degrees of a scene, and combining said second combined equirectangular image with a sufficient plurality of images to produce a second combined panoramic image, representing about 180 degrees of a scene, and means for displaying said first combined panoramic image and said second combined panoramic image in a manner which produces a stereoscopic, panoramic image.

19. The imaging system of claim 18, wherein said stereoscopic, panoramic image displays about 360 degrees of a scene.

20. The imaging system of claim 1, further combining said first combined equirectangular image and said second combined equirectangular image with a digital image, to produce a stereoscopic image within said digital image.

21. An imaging system comprising:
(a) a first image capture device having a first orientation;
(b) a second image capture device having a second orientation different from said first orientation;
(c) a third image capture device having a third orientation different from said second orientation;
(d) a fourth image capture device having a fourth orientation different from said third orientation;
(e) means for combining a first image captured with said first image capture device with a second image captured with said second image capture device to produce a first combined equirectangular image; and
(f) means for combining a third image captured with said third image capture device with a fourth image captured with said fourth image capture device to produce a second combined equirectangular image that is different from said first combined equirectangular image.

22. The imaging system of claim 21, further comprising means for displaying said first combined equirectangular image and said second combined equirectangular image as a stereoscopic image.

23. The imaging system of claim 22, wherein the stereoscopic image forms a portion of a 360 degree panoramic stereoscopic image.

24. The imaging system of claim 21, wherein said first combined equirectangular image displays at least about 180 degrees of a scene.

25. The imaging system of claim 21, wherein said first combined equirectangular image represents at least about 300 degrees of a scene.

26. A method for producing a stereoscopic image comprising:
(a) obtaining a first image;
(b) obtaining a second image;
(c) obtaining a third image;
(d) combining a first portion of said first image with a portion of said second image to produce a first combined equirectangular image;
(e) combining a second portion of said first image with a portion of said third image to produce a second combined equirectangular image; and
(f) displaying said first combined equirectangular image and said second combined equirectangular image that is different from said first combined equirectangular image in a manner which produces a stereoscopic image.

27. The method of claim 26, further comprising picking up said first image, said second image, and said third image from a plurality of points defining an arcuate line.

28. The method of claim 27, wherein said plurality of points are greater than about five degrees apart, and less than about forty-five degrees apart.

29. The method of claim 27, wherein said plurality of points are greater than about ten degrees apart, and less than about twenty degrees apart.

30. The method of claim 26, further comprising displaying a first plurality of combined equirectangular images in sequence and a second plurality of combined equirectangular images in sequence to produce a stereoscopic motion picture.

31. The method of claim 30, wherein said stereoscopic motion picture represents at least about 180 degrees of a scene.

32. The method of claim 30, wherein each stereoscopic image that comprises the stereoscopic motion picture forms a portion of a 360 degree panoramic stereoscopic image.

33. The method of claim 30, wherein said stereoscopic motion picture represents about 360 degrees of a scene.

34. The method of claim 26, further comprising: feathering overlapping edges of an image in an image buffer by degrading visibility of pixels in an overlap area prior to combining the image into the first combined equirectangular image.

35. An imaging system comprising:
a first image capture unit to capture a first image;
a second image capture unit to capture a second image;
a third image capture unit to capture a third image; and
a processing unit operationally coupled to the first, second, and third image capture units to receive the first, the second, and the third images, wherein a first portion of the first image can be combined with a portion of the second image to provide a first combined equirectangular image, wherein a second portion of the first image can be combined with a portion of the third image to provide a second combined equirectangular image that is different from said first combined equirectangular image, and wherein the first and second combined equirectangular images can be displayed to provide a stereoscopic image.

36. The imaging system of claim 35, wherein said first, the second, and the third image capture units are located approximately equidistant from each other along a substantially arcuate path.

37. The imaging system of claim 36, wherein said substantially arcuate path is defined by a substantially spherical body.

38. The imaging system of claim 35, wherein said first and said second image capture units are separated from each other by an angular distance of about 5 degrees to about 45 degrees along an arc, and wherein said second and said third image capture units are separated from each other by about the angular distance along the arc.

39. The imaging system of claim 35, wherein a field of view associated with said first image capture unit overlaps a field of view associated with said second image capture unit by an overlap amount, and wherein the field of view associated with said second image capture unit overlaps a field of view associated with said third image capture unit by the overlap amount.

40. The imaging system of claim 39, wherein the overlap amount is about 10 percent to about 90 percent.

41. The imaging system of claim 35, wherein a defined image plane associated with said first image capture unit overlaps a defined image plane associated with said second image capture unit by about 1 to about 20 percent.

42. The imaging system of claim 35, wherein said first portion of said first image is between about 20 percent and about 80 percent of said first image, and wherein said portion of said second image is between about 20 percent and about 80 percent of said second image.

43. The imaging system of claim 35, wherein a plurality of said first and said second combined equirectangular images are displayed in sequence to convey motion.

44. The imaging system of claim 35, wherein the first combined equirectangular image is combined with a sufficient plurality of images to produce a first combined panoramic image, representing about degrees 90 degrees of a scene, and wherein the second combined equirectangular image is combined with a sufficient plurality of other images to produce a second combined panoramic image, representing about 90 degrees of the scene, and wherein said first combined panoramic image and said second combined panoramic image are displayed to provide a stereoscopic, panoramic image.

45. The imaging system of claim 44, wherein a set of first combined panoramic images and a set of second combined panoramic images are displayed in sequence to provide a stereoscopic, panoramic motion picture.

46. The imaging system of claim 45, wherein the stereoscopic, panoramic motion picture forms a portion of a 360 degree panoramic stereoscopic image.

47. The imaging system of claim 44, wherein the stereoscopic, panoramic image forms a portion of a 360 degree panoramic stereoscopic image.

48. The imaging system of claim 35, wherein the first combined equirectangular image is combined with a sufficient plurality of images to produce a first combined panoramic image, representing a 360 degree panoramic monoscopic image, and wherein the second combined equirectangular image is combined with a sufficient plurality of other images to produce a second combined panoramic image, representing a 360 degree panoramic monoscopic image, and wherein said first combined panoramic image and said second combined panoramic image are displayed to provide a stereoscopic panoramic image.

49. The imaging system of claim 48, wherein said stereoscopic, panoramic image forms a portion of a 360 degree panoramic stereoscopic image.

50. An imaging system comprising:
an image capture unit to provide an image; and
a processing unit coupled to the image capture unit to receive a first portion of said image to provide a first monoscopic equirectangular image, and to receive a second portion of said image to provide a second monoscopic equirectangular image that is different from said first monoscopic equirectangular image.

51. The imaging system of claim 50, further comprising means for displaying said first monoscopic equirectangular image and said second monoscopic equirectangular image as a stereoscopic image.

52. The imaging system of claim 51, wherein said stereoscopic image forms a portion of a 360 degree panoramic stereoscopic image.

53. The imaging system of claim 50, further comprising:
a plurality of image capture units coupled to the processing unit, the plurality of image capture units to provide a plurality of images, wherein selected ones of the plurality of images are combined with at least one other image to produce a plurality of combined equirectangular images, wherein the plurality of combined equirectangular images are combined to provide a first panoramic image and a second panoramic image, and wherein the first panoramic image and the second panoramic image are combined to provide a panoramic, stereoscopic image.

54. The imaging system of claim 53, wherein said first panoramic image displays about 90 degrees of a scene.

55. The imaging system of claim 53, wherein said panoramic, stereoscopic image displays about 180 degrees of a scene.

56. The imaging system of claim 53, further comprising a means to display the panoramic, stereoscopic image coupled to the processing unit.

57. The imaging system of claim 53, wherein said panoramic, stereoscopic image displays about 360 degrees of a scene.

* * * * *

UNITED STATES PATENT AND TRADEMARK OFFICE
CERTIFICATE OF CORRECTION

PATENT NO. : 6,947,059 B2
DATED : September 20, 2005
INVENTOR(S) : Pierce et al.

It is certified that error appears in the above-identified patent and that said Letters Patent is hereby corrected as shown below:

Title page,
Item [56], References Cited, OTHER PUBLICATIONS,
"US1995000401550" reference, delete "directional-treadmill" and insert -- directional treadmill --, therefor.

Column 9,
Line 62, delete "equirectangular" before "image".
Line 63, after "combined" insert -- equirectangular --.

Column 10,
Line 48, after "image" insert -- that is different from said first combined equirectangular image --.
Lines 50-52, after "image" delete "that is different from said first combined equirectangular image" .

Column 11,
Line 64, after "about" delete "degrees".

Column 12,
Line 25, after "stereoscopic" insert -- , --.

Signed and Sealed this

Sixth Day of December, 2005

JON W. DUDAS
*Director of the United States Patent and Trademark Office*